Jan. 13, 1931.    P. L. TENNEY    1,788,899
VARIABLE SPEED TRANSMISSION CONTROL
Filed Feb. 9, 1929    3 Sheets-Sheet 1
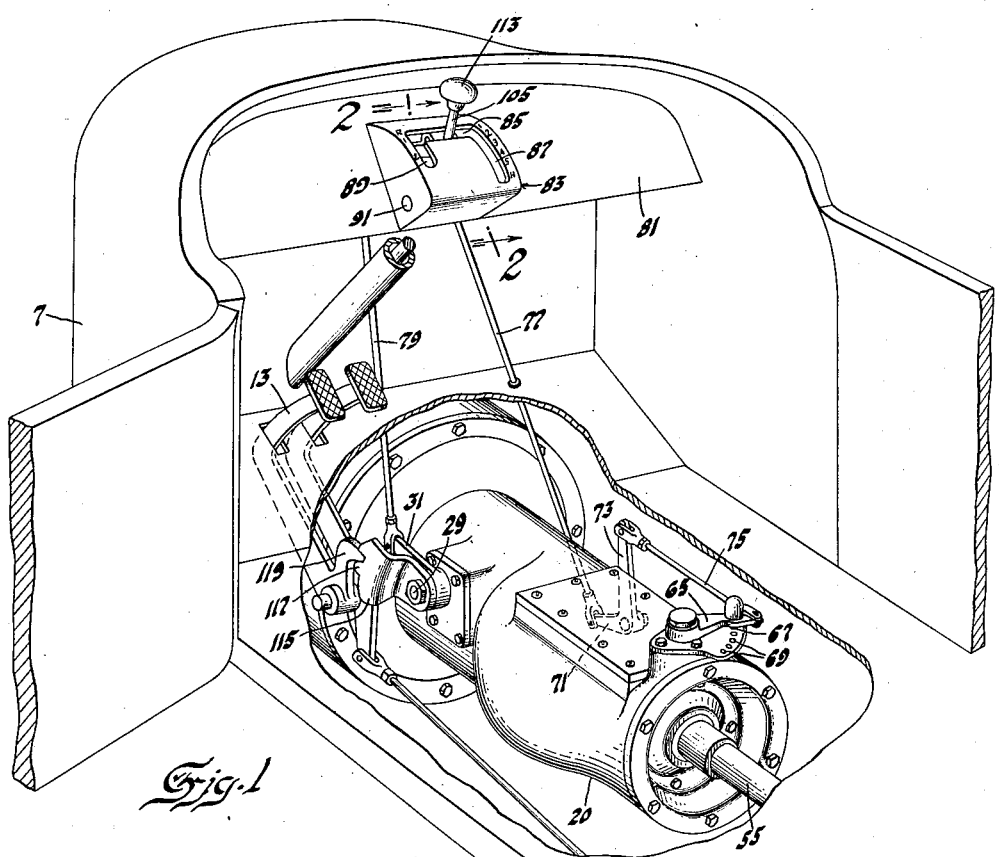
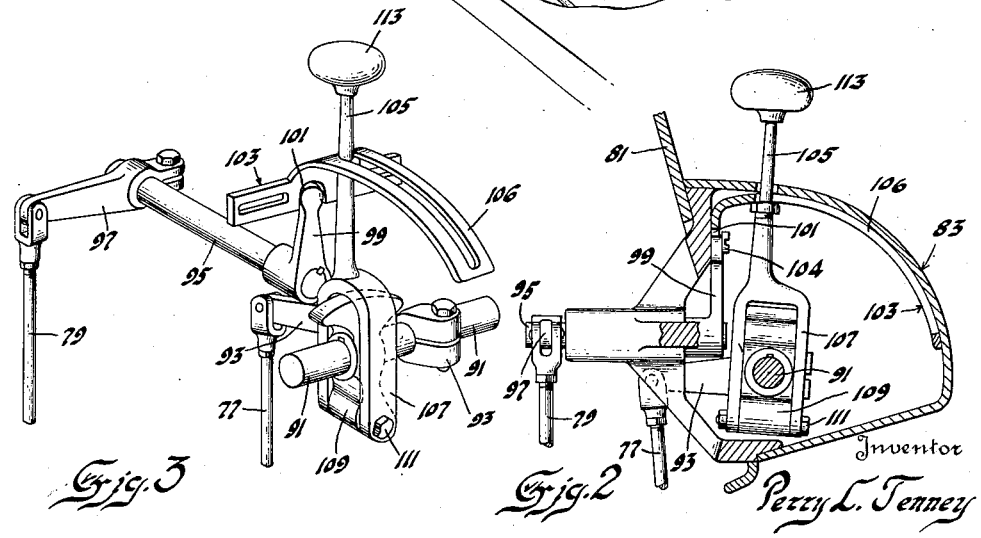

Jan. 13, 1931.     P. L. TENNEY     1,788,899
VARIABLE SPEED TRANSMISSION CONTROL
Filed Feb. 9, 1929     3 Sheets-Sheet 2
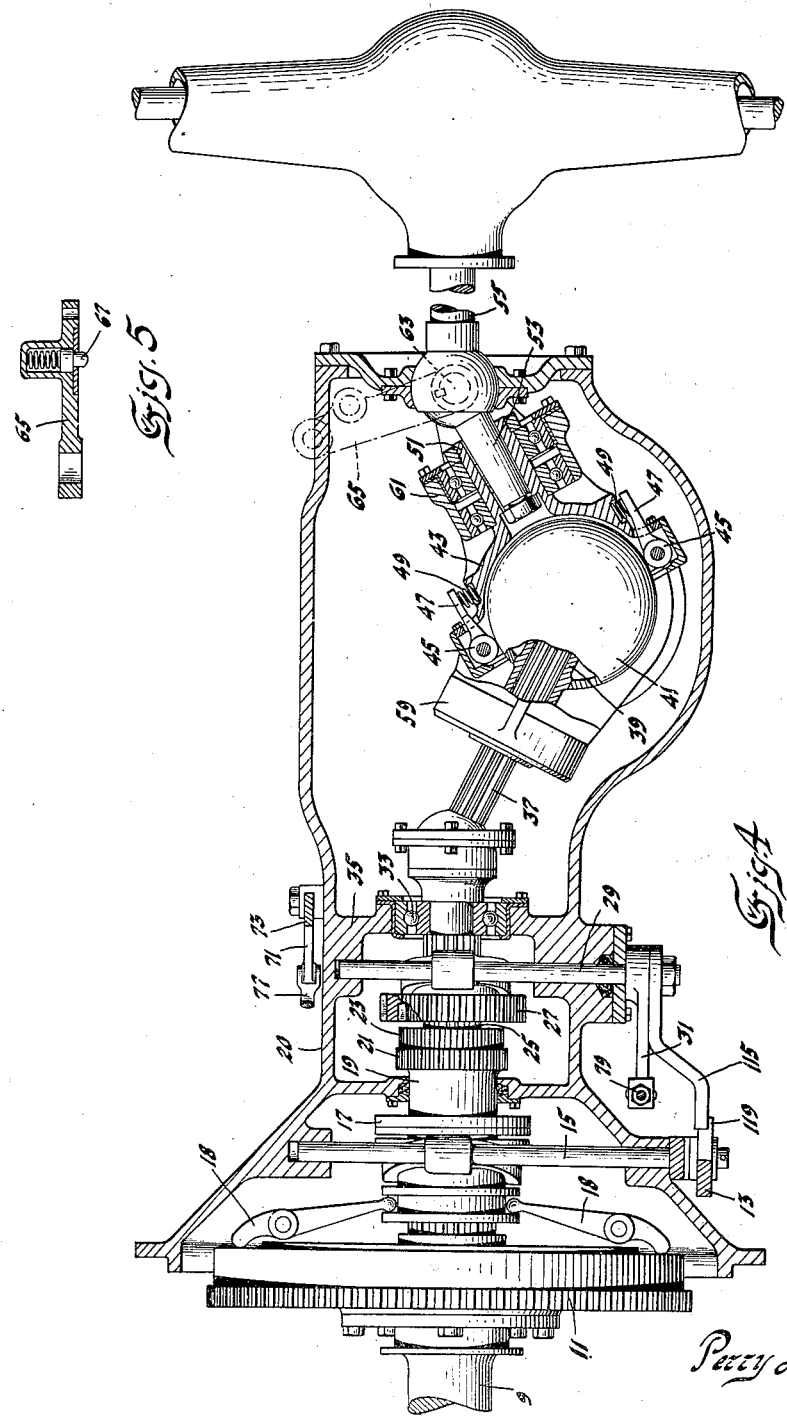

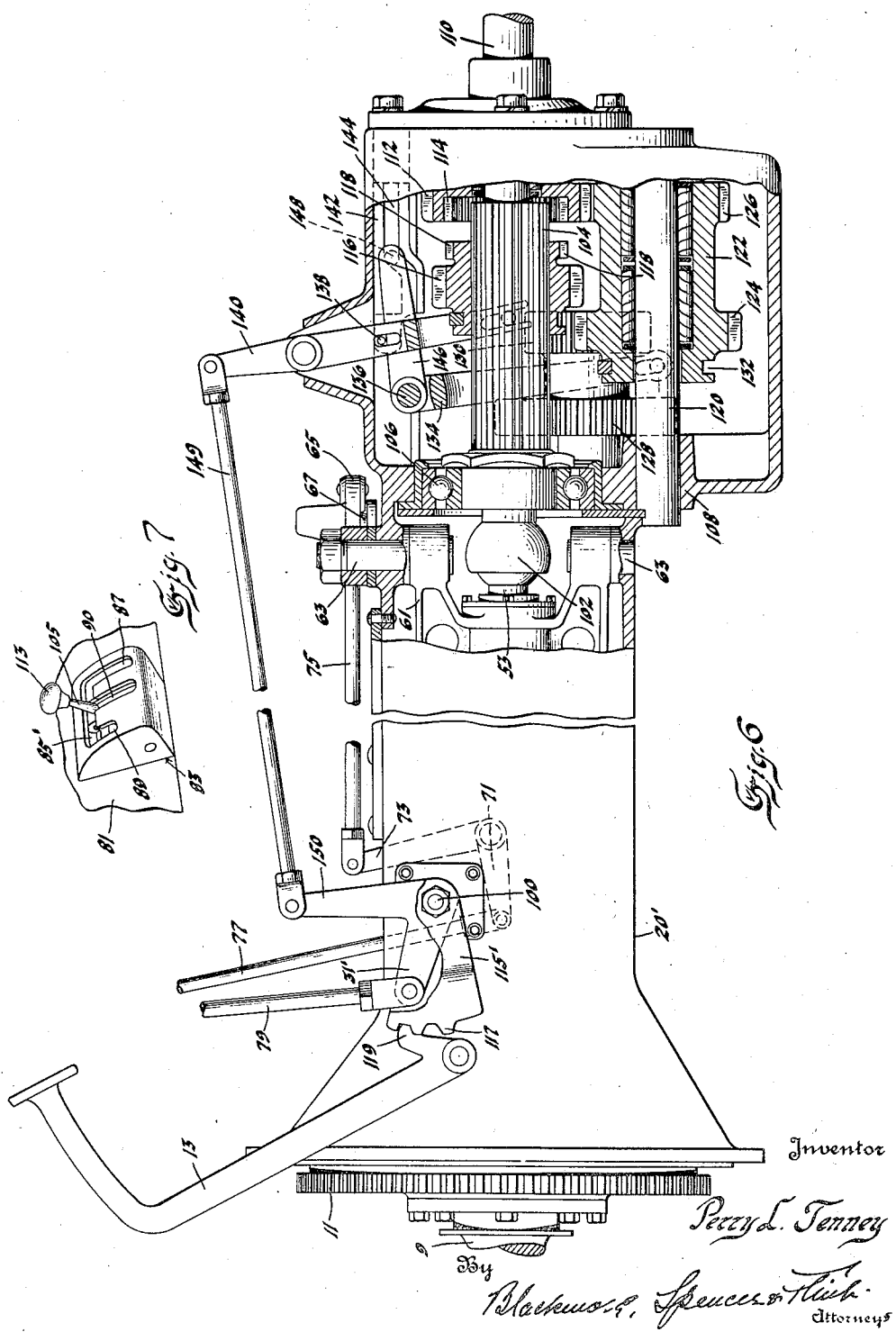

Patented Jan. 13, 1931

1,788,899

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

VARIABLE-SPEED-TRANSMISSION CONTROL

Application filed February 9, 1929. Serial No. 338,720.

This invention relates to transmission mechanisms, and particularly to a single manual control mechanism for a plurality of transmission units.

An object of the invention is to provide a single control member for a plurality of transmission units.

As a further object, the invention aims, by a single control member movable in two unlike directions, to operate two transmission units arranged in series.

More specifically, the control member is to have one range of movements or parallel ranges of movement to progressively obtain a series of speed ratios by its controlling action upon one of said units, and a second range of movements for actuating the other unit, the second range of movements intersecting the first range or ranges in the low speed position of the latter.

As a still further object, the invention provides a locking connection whereby gear shifting may not be effected until after the clutch is released.

Other objects and advantages will be understood from the following specification.

In the drawing accompanying this description:

Figure 1 is a view in perspective of the novel operating mechanism;

Figure 2 is a section on line 2—2 of Figure 1;

Figure 3 is a perspective of the movable parts constituting the control mechanism;

Figure 4 is a horizontal section of the transmission units;

Figure 5 is a sectional view through a detail;

Figure 6 is a view partly in elevation and partly in section of a modified form;

Figure 7 is a perspective of a modified control.

The invention, being intended more particularly for use on vehicles, is shown in that relation. Briefly outlined there is shown in Figure 4 a gear shift device for driving in a forward direction, or in reverse, this gear shifting device being in series with a variable speed unit, the latter providing a plurality of speeds without shifting of clutches or gears. These units are associated with a clutch for connecting the series with an engine shaft and they are also associated with a propeller shaft designed to drive the rear axle of the vehicle. The invention is chiefly concerned with the single control mechanism whereby one and the same instrumentality is effective to operate the two power transmitting units, and whereby a necessary relation with the clutch is provided for. In Figure 6 is a modified gear shift in a changed position, the two transmission units likewise subject to a single control member.

Referring by reference characters to the drawing, numeral 7 designates a part of the body of the vehicle which is to be mounted on the chassis frame, the latter equipped with the driving mechanism. This mechanism comprises an engine, not shown, but operating to rotate a shaft 9 carrying a flywheel 11. The engine may be connected with the transmission by a clutch associated with the flywheel, the details of the clutch not being shown, as these details constitute no part of this invention. The clutch is released by a pedal 13 mounted to rotate shaft 15. This shaft operates through the instrumentality of a throwout bearing 17 and levers 18. At 19 is a clutch-driven shaft terminating in a gear 21 and clutch teeth 23. This transmission may be housed within a casing 20 which, if desired, may be made an integral part of the clutch housing. The transmission is not fully illustrated, as this invention is not concerned with its details. The gear 21 is to engage and drive a countershaft gear and the countershaft by its rotation is to rotate a reverse idler gear. On the driven shaft 25 is slidably mounted a gear 27. This gear member may be at times arranged to be clutched to the teeth 23 whereby shaft 25 is driven at the same speed as shaft 19. Gear 27 may also be moved to a neutral position and to a position in which it is engaged with the reverse idler whereby shaft 25 is driven from 19, but in a reverse direction of rotation. For sliding the gear 27 there is provided a rock shaft 29 suitably journalled in the casing and provided with a lever arm 31.

Shaft 25 is rotatable in a bearing 33 in wall 35 of casing 20. To the rear of this wall, shaft 25 is coupled by a ball joint to spline shaft 37. Shaft 37 is telescopically slidable in a sleeve 39 which carries a hollow spherical ball 41. A carrier 43 surrounds one-half of the spherical ball and is provided with rollers 45 supported by lever 47 pressed by springs 49 to hold the rollers against the surface of the spherical ball. The hollow stem 51 of the carrier 43 is secured to shaft 53, the latter shaft being united by a universal joint to a propeller shaft 55, the joint being located in the rear wall of housing 20.

Surrounding the shaft 37 and the hollow stem 51 are rings designated by numerals 59 and 61. These rings may have extensions which are jointed together in any convenient manner on an axis diametrically arranged with reference to the spherical member 41. Ring 61 is extended to the rear wall where it is suitably pivoted at 63 and provided with an operating arm 65. By the rocking of said arm the angular relation of shafts 37 and 53 is changed, and by such change shaft 53 may be driven from shaft 37 at a plurality of reduction speed ratios. The drive is direct when the shafts are in alignment. The degree of reduction depends upon the angularity between the shafts. Lever 65 is provided with a spring pressed detent 67, as shown in Figure 5, cooperating with a series of pockets 69, as shown in Figure 1, whereby a plurality of speed reduction ratios is determined. A suitable bell crank lever 71 is provided with an arm 73 connected by means of link 75 with a lever arm 65. An operating link arm 77 is connected to the other arm of the bell crank.

Lever arm 31, associated with shaft 29, is also provided with a connecting link 79 through the instrumentality of which the forward and reverse gear shifting mechanism is operated.

A single operating mechanism is provided to effect the necessary movements of link members 77 and 79 whereby this one operating mechanism serves to control both the reversing mechanism and the variable speed mechanism. Upon a suitable board 81 is fastened a box 83. This box has its face curved and provided with a slot 85 extending transversely of the vehicle. A relatively long slot 87 at the right of the box extends downwardly from the right hand end of slot 85, as shown in the drawing. From the left hand end of slot 85 there is a relatively short slot 89 also extending at right angles to slot 85. Within the box is a shaft 91 to which is clamped an arm 93. This arm 93 is connected to link 77, as shown. Also, within the box is a second shaft 95 at right angles to shaft 91, and having an arm 97 connected to link 79. Shaft 95 also has an arm 99 which is received within a notch 101 in a sliding guide 103. The guide has slots for the reception of guiding pins 104, as shown in Figure 2. The guide is also formed with a slotted arm 106 through which the manually operable lever 105 extends. This lever is forked at its lower end 107, the furcations straddling and being pivoted to a lug 109, as at 111, which lug is keyed to shaft 91. The lug has at its upper end a curved surface on a center coincident with pin 111 to accommodate the movement of the forked end of the member about pin 111. By this construction the lever 105 may be freely swung about its axis 111 without producing any rotary effect upon shaft 91, but if turned in a direction at right angles to the aforesaid movement it will, through its engagement with lug 109, rotate shaft 91, such rotation through the instrumentality of arm 93 serving to operate the variable speed transmission in an obvious manner. The last-said movement is accompanied by a movement of the lever through the slotted arm 106 of the guide. It, therefore, has no effect upon the gear shifting device since it does not move the guide 103. When, however, lever 105 is rocked on pivot 111, which is possible only when the lever is in the upper end of slots 87 or 89, and in slot 85 it moves the guide transversely and rotates shaft 95 through arm 99 and actuates link 79. By this means the gear shift mechanism may be changed from forward to reverse. In the illustration, a shift of the ball end 113 of the lever 105 to the left operates to shift through a neutral position into reverse, a shift to the right changing the shift mechanism to forward drive. When at the right hand end of slot 85, the lever may be moved downward in slot 87, this being accompanied by a pull upon link 77. This is transmitted to the jointed shafts 37 and 53, reducing the angularity therebetween, and bringing the shafts into alignment at the time when the lever reaches the bottom of the slot 87. The drive is then direct and forward. When the lever 105 is at the left hand end of slot 85 the change speed transmission will be in reverse and the drive will be at the lowest speed afforded by the variable transmission unit. The slot 89 permits lever 105 to be moved downwardly to a limited extent so that a reverse drive at a speed somewhat higher than the lowest may be had. The limited length of slot 89 prevents a drive at high speed in a reverse direction.

No movements of the clutch are needed to make the shifts for the variable speed transmission. The lever may be moved up and down in slot 87, as desired. It is obvious, however, that shifting from forward to reverse requires the release of the clutch. Provision has been made to prevent the transverse movement of the lever 105 in slot 85 when the clutch is engaged. To that end an arm 115 is secured to shaft 29 and to lever 31, which arm 115 has teeth 117, the space between which is engaged by a tooth 119 on the clutch pedal, as shown in Figure 1. The parts are so arranged that, if it be attempted to move lever 105 transversely in slot 85, a rocking of arm 115 is prevented by the engagement of the teeth 117 and 119, if the clutch pedal is in its released position. It, therefore, becomes necessary to depress the clutch pedal whenever lever 105 is moved transversely in slot 85 to change the gear shift mechanism between forward and reverse.

By the arrangement described, the several forward speeds are accomplished by merely moving the lever 105 up and down through slot 87, there being no occasion to release the clutch for such changes. Provision is made for at least two speed changes in reverse by moving the lever up and down in slot 89. To change from forward to reverse, or vice versa, it is only necessary to depress the clutch and move the lever transversely in slot 85, such shifting being prevented until after first releasing the clutch owing to the locking device involving part 115.

Another form which the invention may take is shown in Figure 6. In this form of the invention the gear shift mechanism is modified to provide, in addition to a direct, forward and reverse gear driving arrangement, as in the form described above, another gear reduction drive in a forward direction. Also, an optional arrangement is illustrated in this figure, consisting in the location of the gear shift mechanism to the rear of, instead of in front of, the variable speed transmission. Such a further reduction may be needed where especially heavy loads are to be handled, and in such cases the greater torque may better be assumed by the gear mechanism than by increasing the weight and size of the variable speed transmission unit. For this reason, the gear shift unit is placed to the rear of the variable speed unit.

A further modification of the control mechanism will be required, whereby the speed ranges of the variable speed unit may be associated with the added low speed gear train.

Referring to Figure 6, numeral 9 represents the engine shaft and 20' the combined housing for the clutch and transmission. The clutch pedal is shown at 13. It has a tooth 119 cooperating with teeth 117 on an arm 115' on a stub shaft 100, and movable with arm 31', which latter corresponds to arm 31 of the form described above. Link 79 is connected to arm 31'. Link 77 operates from the single control to produce movements of the variable speed unit. The connections, as before, include the bell crank with its arm 73, the link 75 and the lever arm 65. The variable speed unit is the same as in the form described above, only the rear end portions such as shaft 53 and yoke 61 being shown.

It will be understood that the gear shift unit between the clutch and the variable speed unit is omitted from this form of the invention, with the result that the variable speed unit will be moved forward, and its front universal joint will be associated with a shaft corresponding to shaft 19 of the form first described. Shaft 53, the driven shaft of the variable speed unit, is jointed as at 102 with a spline shaft 104 rotatable in suitable bearings 106 in a casing wall 108. This spline shaft is piloted into the front end of a driven shaft 110, which is to be suitably mounted in the rear casing wall and jointed to a propeller shaft and rear axle, as usual. At its front end the shaft 110 has a gear 112 and an internal clutch 114. Slidable on the spline shaft is a gear 116 having clutch teeth 118 to engage clutch teeth 114. When so engaged, shaft 104 is directly coupled to shaft 110. The gear shift unit also has a shaft 120 rotatably and slidably supporting a gear ring 122, the latter having gear elements 124 and 126. The gear element 126 is adapted to mesh with gear 112. The transmission unit also includes an idler having two gear elements 128 and 130, the former to be at times engaged with gear 116 and the latter with gear 124. Gear ring 122 has a collar 132 engaged by a forked arm 134 of a bell crank lever pivoted on a fixed pivot pin 136. The lever 140 is forked at its lower end to engage the collar of gear 116. Slidable in the casing is a rail 142. This rail has a cam slot 144, a terminal pin 148 on the lever arm 146 travelling in the slot and causing, at times, a rotation of the bell crank lever on its pivot 136. It will be seen that lever 140 is moved by a link 149 connected to an arm 150 formed rigid with arm 31' described above. Lever 140 has a pin and slot connection as at 138 with rail 142.

The gear shift mechanism is shown in its neutral position. In that position the clutch elements 118 and 114 are out of engagement. The countershaft gear 126 is in mesh with gear 112, but is not being rotated by the driving mechanism. The reverse idler is in mesh with gear 124, but it, too, is not being driven by the engine. To shift from this neutral position to low speed, gear shift lever 140 is moved in a clockwise direction to effect the engagement of gear 116 with gear 124. In so moving the lever 140 the shift rail 142 is also moved to the left in Figure 6. The pin 148 traverses the straight portion of the cam slot as the shift rail is so moved and, in consequence, the lever arm 146 is not rotated. The gear member 122 remains as shown in Figure 6. With gear 116 in mesh with gear 124, the drive is through gears 116, 124, 126 and 112. The speed reduction is determined by the relative sizes of these gears. If a further movement in the same direction be given to lever 140, there is a further movement of the rail 142 with a still further relative sliding movement of pin 148 in the straight part of the cam slot. While this movement is taking place, gear 116 is being moved out of mesh with gear 124 and into mesh with gear 128. The transmission is then in a reverse direction, being effected through the following gear elements: 116, 128, 130, 124, 126 and 112. If the lever 140 be then operated in the reverse direction, and turned counter-clockwise about its pivot, it passes through the aforesaid low speed position and into the neutral position shown by Figure 6. A further movement in the same direction effects the clutching of teeth 118 with teeth 114 for a direct drive. Before the clutch teeth engage, lever arm 134 has moved gear 122 to the left so that gear 124 is no longer in mesh with gear 130, and the engagement of 126 with 112 is also disconnected. This is accomplished since the angular part of the cam slot is engaged with the pin 148 during this part of the movement. It will be observed, therefore, that the gear shift arrangements described provide for a progressive shift from direct, through neutral, to low speed, and then to reverse. These movements are brought about by a continuous movement of lever 140 about its pivot.

As stated above, there is provided a change in the control unit. The rods 77 and 79 are the same as before, and the internal mechanisms remain the same. It will be seen that as the control lever 105 moves through the transverse slot 85', Figure 7, it moves the gear shift mechanism, not merely from direct speed through neutral and into reverse, Figure 1, but from direct speed through neutral into low speed, and then into reverse. The shift is progressive, as before, but the control lever has a new position, a new low speed gear drive, at a position between the ends of slot 85'. At that position there may be, and preferably is, provided an added slot 90 parallel with slots 87 and 89. By this means the control lever may be moved up and down in slot 90 to secure the drive ratios afforded by the variable speed unit, which ratios may in this way be asociated with the low speed of the gear transmission unit, as well as the direct drive of the gear transmission unit.

This last described arrangement is regarded as quite important. The ratio obtained by the lever when at the bottom of slot 90 is substantially the same as that corresponding to a position of the lever at an intermediate position of slot 87. It will therefore be seen that there will be obtainable a greater number of low speed ratios owing to the length of slot 90 than would be possible by shifting transversely in slot 85; and then down in slot 87. Furthermore, while the gear transmission is in low speed, it is possible to speed the driven shaft 110 above the speed at which it is to rotate when the clutch elements 118 and 114 are brought into mesh. This will accommodate the time interval in shifting and aid in securing a synchronizing engagement of the clutch teeth.

I claim:

1. A control device for a plurality of transmission units, said device comprising a housing, a first and a second shaft positioned at substantially right angles to each other and journalled within said housing, said second shaft having a lug rigid therewith, a lever pivoted to said lug on one side of said shaft on an axis at right angles to said shaft, a guide slidably mounted in said housing, said guide having a slot for the movement of said lever in rocking said second shaft, said first shaft having an arm articulated to said guide whereby the lever may rock the first shaft through the sliding movement of the guide.

2. The invention defined by claim 1, said lever having its ends extending alongside said lug and rocking the second shaft by the engagement of the ends with said lug.

In testimony whereof I affix my signature.

PERRY L. TENNEY.